(12) United States Patent
Byrne et al.

(10) Patent No.: US 11,140,263 B2
(45) Date of Patent: *Oct. 5, 2021

(54) SYSTEMS AND METHODS FOR BLOCKCHAIN WIRELESS SERVICES IN A CONTROLLED ENVIRONMENT

(71) Applicants: Michael Francis Byrne, Irving, TX (US); Brian Francis Byrne, Irving, TX (US)

(72) Inventors: Michael Francis Byrne, Irving, TX (US); Brian Francis Byrne, Irving, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/953,676

(22) Filed: Nov. 20, 2020

(65) Prior Publication Data

US 2021/0075909 A1    Mar. 11, 2021

Related U.S. Application Data

(63) Continuation of application No. 16/874,391, filed on May 14, 2020, now Pat. No. 10,855,838, which is a continuation of application No. 16/517,620, filed on Jul. 21, 2019, now Pat. No. 10,694,032.

(60) Provisional application No. 62/714,737, filed on Aug. 5, 2018.

(51) Int. Cl.
| | |
|---|---|
| *H04M 3/42* | (2006.01) |
| *G06F 16/182* | (2019.01) |
| *H04M 3/22* | (2006.01) |
| *G06Q 20/38* | (2012.01) |
| *H04W 84/18* | (2009.01) |

(52) U.S. Cl.
CPC .... *H04M 3/42221* (2013.01); *G06F 16/1824* (2019.01); *G06Q 20/382* (2013.01); *H04M 3/2281* (2013.01); *H04W 84/18* (2013.01)

(58) Field of Classification Search
CPC ............ G06F 16/1824; G06Q 20/382; H04M 3/2281; H04M 3/42221; H04W 84/18
USPC ........ 379/188–200, 201.01, 210.02; 455/411
See application file for complete search history.

(56) References Cited

U.S. PATENT DOCUMENTS

| | | | | |
|---|---|---|---|---|
| 5,485,507 A | * | 1/1996 | Brown .............. | H04M 3/42221 379/114.17 |
| 8,121,264 B1 | * | 2/2012 | Hogg, Jr. ............ | H04M 1/6505 379/88.22 |
| 9,014,661 B2 | * | 4/2015 | deCharms ............ | G06Q 50/265 455/404.2 |

(Continued)

*Primary Examiner* — Harry S Hong

(57) ABSTRACT

A method of providing blockchain wireless services in a controlled environment is provided. The method comprises a wireless communication device associated with an inmate of a controlled environment receiving one of a voice and video call from a device external to the controlled environment. The method further comprises the device placing the received call into a hold state and sending a request for validation of the call via a blockchain, the request identifying at least parties to the call. The method further comprises the device, upon receipt of validation, removing the call from the hold state; and enabling at least one of voice and video functionality for the parties. The method further comprises the wireless communication device sending the request for validation to a telecommunications server and the server conducting real time monitoring of the call. The method further comprises the device continuously recording the call.

38 Claims, 1 Drawing Sheet

(56) References Cited

U.S. PATENT DOCUMENTS

| | | | |
|---|---|---|---|
| 9,794,788 B2 | 10/2017 | Byrne | |
| 9,965,746 B1* | 5/2018 | Keiser | G06Q 10/109 |
| 10,313,510 B2* | 6/2019 | Chang | H04M 3/2218 |
| 10,497,242 B2 | 12/2019 | Williams | |
| 10,536,445 B1 | 1/2020 | Lerner | |
| 10,607,307 B1* | 3/2020 | Pickens | G06Q 20/102 |
| 10,636,067 B2* | 4/2020 | Collins | G06Q 10/00 |
| 10,644,889 B1 | 5/2020 | Govindaraj | |
| 10,694,032 B2* | 6/2020 | Byrne | G06Q 20/322 |
| 10,855,838 B2* | 12/2020 | Byrne | H04M 3/42221 |
| 2017/0031874 A1* | 2/2017 | Boudville | G06Q 20/3229 |
| 2017/0132615 A1* | 5/2017 | Castinado | G06F 16/2255 |
| 2018/0048738 A1* | 2/2018 | Hinds | H04L 9/3236 |
| 2018/0109541 A1* | 4/2018 | Gleichauf | H04W 12/10 |
| 2019/0044703 A1* | 2/2019 | Smith | G06F 16/538 |
| 2019/0172023 A1* | 6/2019 | Brandborg | G06Q 20/22 |
| 2019/0325420 A1* | 10/2019 | Gardner | G06Q 20/32 |
| 2019/0394637 A1* | 12/2019 | Viswanathan | H04W 8/28 |
| 2019/0394648 A1* | 12/2019 | Tipton | H04L 63/083 |
| 2020/0045167 A1* | 2/2020 | Byrne | G06Q 20/382 |
| 2020/0274967 A1* | 8/2020 | Byrne | G06F 16/1824 |

* cited by examiner

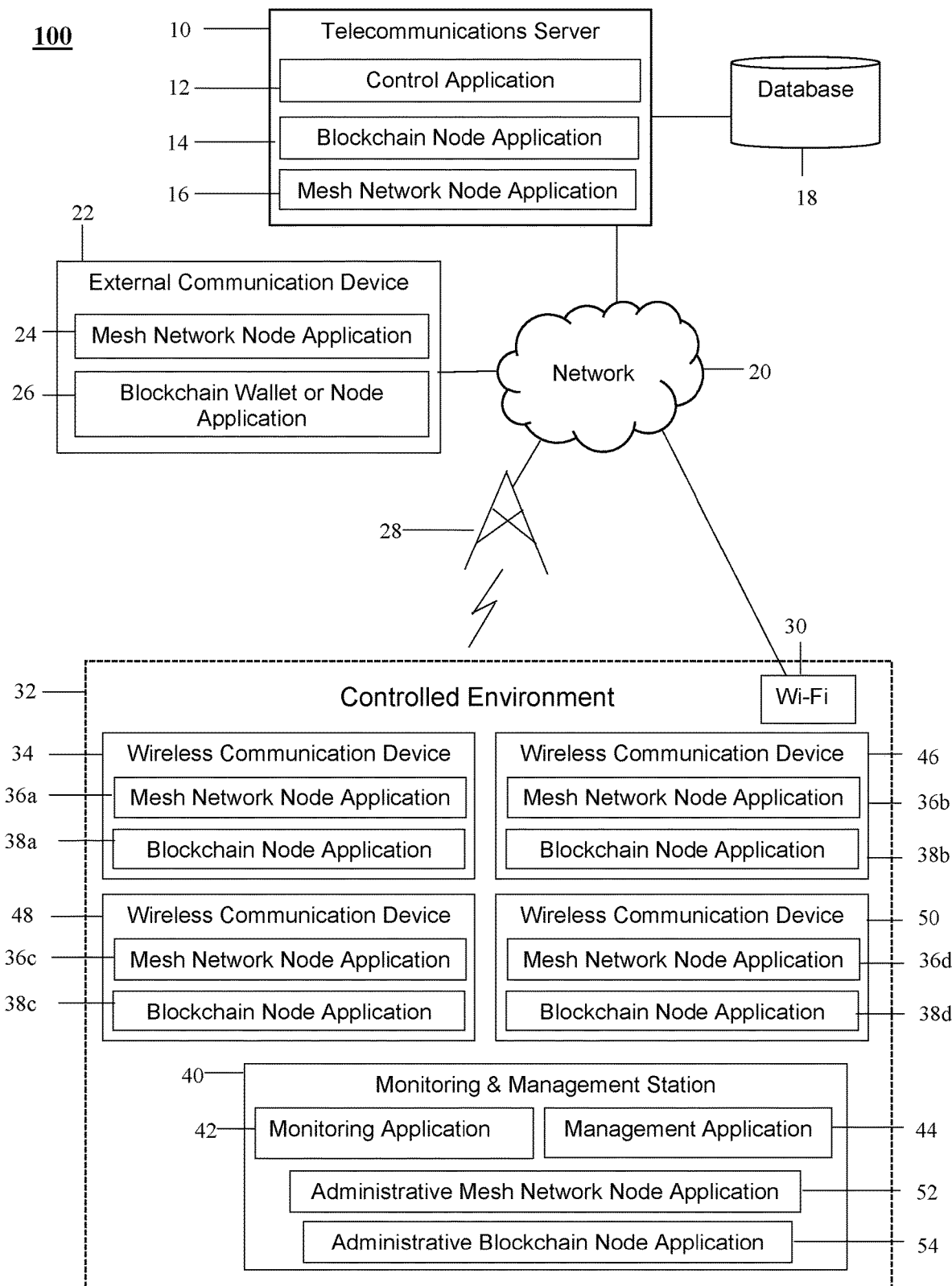

SYSTEMS AND METHODS FOR BLOCKCHAIN WIRELESS SERVICES IN A CONTROLLED ENVIRONMENT

CROSS-REFERENCE TO RELATED APPLICATIONS

This application is a continuation of U.S. patent application Ser. No. 16/874,391, filed May 14, 2020, which claims the benefit of U.S. of U.S. Pat. No. 10,694,032, filed Jul. 21, 2019, which claims the benefit of U.S. provisional application 62/714,737 filed Aug. 5, 2018, each of which is incorporated by reference herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present disclosure is in the technical field of telecommunications services. More particularly, the present disclosure is in the technical field of wireless telecommunications services provided in controlled environments.

SUMMARY OF THE INVENTION

The present invention is a controlled environment wireless system and provides systems and methods of utilizing a blockchain network for providing, managing and administering a controlled environment wireless system.

BACKGROUND

Telecommunications services for inmates and other detainees in prisons and other controlled environments is a controversial and important subject. Inmates have a right and deserve to regularly communicate with at least family members and providers of legal services. Wardens and other supervisors of controlled environments must provide such services but are responsible for security of inmates and employees. Wireless devices in controlled environments present particular challenges as they are small and can therefore be concealed and moved about easily.

In traditional telecommunications systems of controlled environments, the administrative costs involved in recording and maintaining data associated with inmate phone use are limited by the number of phone kiosks in the controlled environment. This number is typically small and therefore makes it reasonable to maintain such administration via a single conventional, centralized computing center, whether located on site in the correctional facility or in a remote site. However, as the number of these telecommunication devices and the complexity of the system increases with the introduction of mobile devices to prisoners, inmates, arrestees, residents or other detainees in controlled environments, the amount of cost and complexity involved in maintaining the records and monitoring permissions increases significantly.

BRIEF DESCRIPTION OF THE DRAWINGS

FIG. 1 is a block diagram of a system of blockchain wireless services in a controlled environment according to an embodiment of the present disclosure.

DETAILED DESCRIPTION OF THE INVENTION

Systems and methods described herein provide for a wireless communication device in possession of a detainee confined to a controlled environment to securely place and receive wireless voice and data transmissions to and from parties outside the environment via use of blockchain technology. A call, whether incoming or outgoing, includes information associated with a transaction to be stored in a blockchain. The blockchain is updated by disseminating the transaction information through a multipath wireless mesh network to other wireless devices in possession of fellow inmates. Prison management and others also receive the transaction information.

The wireless device in possession of the detainee acts as a blockchain node. The device further acts as a network node in a wireless mesh network or multipath wireless mesh network. The mesh networks operate on one or more of a Wi-Fi network, a radio frequency network, or via use of other mobile ad hoc network-capable technology.

A blockchain is a database that is distributed among multiple computing devices. A blockchain is formed from blocks, with each block having information related to a transaction and linking the block to a prior block in the chain. The devices can each have respective copies of the blockchain, so that no centralized or official copy of the blockchain exists and the devices are trusted equally. When a user engages in a transaction, some or all devices may verify the transaction. After verification, the devices can include information related to the transaction into their respective copies of the blockchain.

Blockchain technology allows a network of computers to agree at regular intervals on the true state of a distributed ledger. The ledger is distributed across many participants in the network. The ledger does not exist in any one place. Instead, copies exist and are simultaneously updated with every fully participating node in the ecosystem.

Blockchain technology use in a multipath wireless network as described herein may distribute requirements of a telecommunication system to many distributed nodes. Blockchain may therefore reduce burden on processing, network and storage systems of a correctional facility. By enabling the mobile devices within a controlled environment as blockchain nodes as well as multipath wireless network nodes, not only can much of the computing power be offloaded from a facility's systems but the facility may safely and securely maintain the same control and oversight as previously available.

Recordkeeping and regulation of inmate device use may be distributed as provided herein, with security and computing power increasing as a system grows. By distributing a blockchain ledger among nodes in a closed system of a controlled environment, not only is the computing power distributed across nodes, but the records of the transactions within a system may also be distributed and replicated. This structure may promote redundancies and failsafe options not previously available.

A distributed blockchain system creates a more permanent and unalterable record than a single database could, while allowing more nodes to function simultaneously. Distributed systems promoted by blockchain technology provide controlled environments the potential to distribute regulation of the system by giving the nodes the ability to regulate themselves anonymously from each other and transparent to those administering a controlled environment. Not only can more devices be supported, but they can be supported with fewer resources and increased security.

Blockchain may also reduce costs of running a secure network which is important in publicly funded institutions such as controlled environments. Because blockchain verifies trustworthiness, a centralized server does not need to handle this task. Friction of transactions is reduced, promoting cost and time savings.

Turning to the figures, FIG. 1 is a block diagram of a system of blockchain wireless services in a controlled environment according to an embodiment of the present disclosure. FIG. 1 depicts components of a system 100 provided herein including a telecommunications server 10, a control application 12, a blockchain node application 14, and a mesh network node application 16.

The system 100 also comprises a database 18, a network 20, an external communication device 22, an external mesh network application 24, and a blockchain wallet or node application 26. The system 100 also comprises a radio frequency network 28, a Wi-Fi network 30, and a controlled environment 32.

The system 100 also comprises wireless communication devices 34, 46, 48, 50. Inmate mesh network node applications 36a-d and blockchain network node applications 38a-d are also provided by the system 100 which are components, respectively, of the wireless communication devices 34, 46, 48, 50. The system 100 further comprises a monitoring and management station 40, a monitoring application 42, a management application 44, an administrative mesh network node application 52, and an administrative blockchain node application 54.

Discussion herein regarding the wireless communication device 34 applies to the wireless communication devices 46, 48, 50 unless otherwise noted. Discussion herein regarding the inmate mesh network node application 36a and blockchain network node application 38a applies to the inmate mesh network node applications 36b-d and blockchain network node applications 38b-d, respectively, unless otherwise noted.

The controlled environment 32 may be a penal facility, correctional facility, rehabilitation center, jail, prison, holding cell, halfway house, or hospital. The controlled environment 32 may be a penitentiary, camp, detention center, or other facility operated by a federal, state, provincial, municipal, military, or other public body or agency. The controlled environment 32 may alternatively be privately operated under contract with a court, correctional agency or other public body. In an embodiment, the controlled environment 32 may be a public hospital or other institution in which non-offending persons reside as wards of a state, province, municipality or other public body.

The wireless communication device 34 is associated with an inmate, detainee or other resident of a controlled environment 32 and originates and receives wireless communications for the inmate. The communications include information associated with transactions to be included in the blockchain. The blockchain is updated by propagating transaction information through one or more of a multi-path wireless mesh network and wireless mesh network to at least other inmate-associated wireless communication devices 46, 48, 50. The wireless communication devices 34, 46, 48, 50 may be mobile phones, cell phones, mobile computing devices, smartphones, desktop computers, laptop computers, tablet computers, custodial telephones, kiosks, or video communication stations.

A wireless system of the controlled environment 32 may be a wireless mesh network or multipath wireless mesh network. The wireless system may operate on at least one Wi-Fi network 30, radio frequency network 28, or other mobile ad hoc network capable technology.

The wireless communication devices 34, 46, 48, 50 may act as wireless mesh network nodes or multipath wireless network nodes using at least the inmate mesh network node applications 36a-d, respectively. The wireless communication devices 34, 46, 48, 50 may act as blockchain nodes using at least the blockchain network node applications 38a-d, respectively.

The monitoring and management station 40 is a collection of processes executing on at least one computer enabling creation, removal, and enforcement of restrictions, verifications, configurations, and authorizations of inmates, visitors, and other persons. Devices may be validated, added, or removed from the multipath wireless mesh network by administrators of the station 40. Transactions may be inspected, analyzed, validated, monitored, and renewed by such administrators.

Administrators include wardens, guards, orderlies, prison staff, jailers, information technology professionals, system administrators, and law enforcement agents. Such administrators may manage various data items associated with inmates which may include altering restrictions applicable to inmates. Such restrictions include device use restrictions, inmate use restrictions, and inmate contact restrictions.

The monitoring application 42 and the management application 44 execute on the station 40. The monitoring application 42 is used by authorized persons to listen to outgoing or incoming detainee calls on a live or recorded basis. These authorized persons may use electronic tools used in various forensic activities. These activities include assisting in the detection of prohibited behavior by detainees, outside parties, and others including penal officers who may be violating or compromising penal facility regulations.

The management application 44 is used by authorized parties to configure the control application 12 and manipulate files stored in the database 18 and elsewhere. In addition to adding, removing and changing detainee calling privileges, schedules and accounts, these actions comprise adding and deleting phone numbers and other contact information details of external devices 22 and associated persons authorized to speak with detainees.

System administrators may use a browser as a "front end" or client software tool provided by the management application 44 to access the control application 12, the database 18 and other components. The management application 44 may provide simplified web forms to add detainees and make other program changes. System administrators may be wardens, senior correction officials, or others that develop and implement policies regarding program administration as a whole.

The station 40 and its components may be located inside, outside or both inside and outside the controlled environment 32. The administrative blockchain node application 52 executes at least partially on the station 40 and provides administrators authority to validate, add, remove the wireless communication device 34 from the blockchain.

The administrative blockchain node 54 allows for truncating and pruning the controlled environment blockchain ledger. The pruned portion is removed from the wireless communication devices 34 and a new controlled environment blockchain ledger is created. The pruned data remains on at least one of the administrative blockchain node 54 and the database 18. All configuration data of the wireless communication devices 34 are then added to the new controlled environment blockchain ledger. Pruning and truncation of the blockchain ledger may take place at scheduled intervals, based on ledger size or other measures, or on an ad hoc basis. The monitoring and management station 40 also functions as an administrative mesh network node application 52.

External communication devices 22, which may, for example, be used by family members or attorneys authorized to contact an inmate, may call the inmate directly on the inmate's wireless device 34. External devices 22 may be wireless telephones, computers, and tablet devices. The external device 22 may interact with the telecommunications server 10 and the control application 12 to establish such contact. While the telecommunications server 10 and its components are illustrated in FIG. 1 as external to the controlled environment 32, in embodiments the telecommunications server 10 may be physically situated inside the controlled environment 32.

The telecommunication server 10 may further act as at least one of a wireless mesh network node and a multipath wireless mesh node 14. The telecommunications server 10 may also function as a blockchain node 16

The telecommunications server 10 and the control application 12 executing thereon manage communications between external devices 22 and components inside the controlled environment 32. These management activities include inspecting, analyzing, validating, securing, monitoring, recording, and encrypting communications between the external devices 22 and the controlled environment 32. The wireless communications devices 34, 46, 48, 50 may also perform these activities.

The wireless communications devices 34, 46, 48, 50 further validate, extract, convert, compress, encrypt, and insert data and meta-data associated with transmissions and transactions of external devices 22 into the controlled environment blockchain ledger. External devices 22 may be designated as trusted devices, illustrated in FIG. 1 as mesh network node application 24 for inclusion into the multipath wireless mesh network.

Configuration data and meta-data for wireless communications devices 34, 46, 48, 50 is added to the blockchain ledger in the form of transactions. Such configuration data and meta-data may comprise inmate information including name and ID, inmate commissary and banking data, SIM identifiers for the devices 34, 46, 48, 50, MAC addresses, and phone numbers. The data and meta-data may also include device identifiers such as IMIE and IP addresses, GPS coordinates, approved contact information, approved applications, approved websites, and validation and biometric information that may include fingerprints, voice prints, and facial recognition data.

Transactions are validated by at least one blockchain node 38*a-d*, 14, 26, 54 and added to the blockchain ledger. Transactions include data and meta-data associated with voice calls, video conferences, text messages, voice mail messages, GPS coordinates, data, and alerts. Transactions also include data and meta-data associated with accesses and interactions with web pages, multimedia files, forms and applications, shared data such as transaction records, transaction attributes, credentials, communication files, and other items of information.

An external device 22 may initiate a transaction, including a voice or video session, with a wireless communication device 34. Transactions also include the other types of electronic interactions described immediately above. The device 34, upon receipt of the incoming communication, places the session into a hold state, and sends a request for validation via the blockchain and to the telecommunications server 10. The request may be validated via the blockchain and the telecommunications server 10 may request and initiate monitoring as part of the validation if monitoring is desired, but validation by the blockchain may not be the sole source of validation. The request contains identification of parties to the call. The telecommunications server 10 may request and initiate a conference call if real-time monitoring is desired.

Upon receipt of validation, the device 34 removes the call from hold state. The inmate may then begin his/her the voice or video session with the caller using the external device 22. The device 34 may record the call.

The recording of the session is continuously validated via the blockchain network to remain within the multipath wireless mesh network. The continuous validation may ensure than any failure of conference call or data upload is remedied by streaming the audio via the multipath wireless mesh network.

Recording of the call and video session between the external device 22 and the wireless communication device 34 is distributed via at least one of the multipath wireless mesh network, the Wi-Fi network 30, and the cellular network 28 to one or more of the database 18 and the blockchain ledger. As part of the continuous confirmation during the session, meta-data for the recording is added to the blockchain ledger.

Validation may comprise adding a blockchain-based smart contract to the blockchain as discussed in detail below. Use of the smart contract facilitates payment by the inmate for communications services.

Inmates using the device 34, 46, 48, 50 may conversely initiate a transaction, which may include a voice or video session or other transaction as defined above, to an external device 22 that may be in possession of a family member, for example. Similar to calls initiated by the external device 22, the device 34 sends a request for validation via the blockchain and to the telecommunications server 10 advising of the parties to the call. The telecommunications server 10 may initiate a conference call if real time monitoring is desired.

Upon validation, the call from the device 34 in possession of the inmate to the external device 22 is completed. The device 34 records the call as previously.

Recording of the call and video session to the external device 22 initiated by the wireless communication device 34 is distributed via at least one of the multipath wireless mesh network, the Wi-Fi network 30, and the cellular network 28 to one or more of the database 18 and the blockchain ledger. As part of the continuous confirmation during the session, meta-data for the recording is added to the blockchain ledger.

The recording of the session initiated by the device 34 is continuously validated via the blockchain network to remain within the multipath wireless mesh network. As previously, the continuous validation may ensure than any failure of conference call or data upload is remedied by streaming the audio via the multipath wireless mesh network.

A blockchain-based smart contract is filled in with necessary information on the device 34 when the device 34 is involved in an outgoing or incoming call or other transaction as defined herein. Tokens purchased previously may be withdrawn from a blockchain wallet account and/or banking account of the inmate and inserted into the contract.

The smart contract is validated and added to the blockchain network by the network of nodes as part of the validation process. Upon attempting of the voice or video call, the contract is executed depending on the outcome of the call. Outcomes include at least one of call failure, no answer, voicemail received, and call completion. Upon completion of the call, coins or funds are released to at least one of a controlled environment wireless system service provider, the facility of the controlled environment 32, and caller depending on rules described in the contract.

The external device 22 acting as a blockchain wallet or node 26 may request a session with the device 34 of an inmate by generating a blockchain enforced communications request. The request is generated by creating a transaction containing the desired scheduling details. The details comprise at least one name of the requesting party, the name of the inmate to be contacted, the inmate ID, requested date and start time of the call, and contact details of the requesting party.

The desired scheduling details are inserted into the blockchain along with payment tokens. The tokens may be pre-purchased or available in account balances of an external party. The tokens may also be available in an inmate's commissary or other approved banking account of the controlled environment 32.

The processing of the blockchain enforced communications request continues upon validation of the external device 22 as an authorized inmate contact. Validation is completed by at least one of the several components including the device 34 of the inmate, the telecommunication server 10, and the control application 12. Validation takes place prior to passing of the request through to the controlled environment wireless system.

Validation of voice and video calling as well as other transactions as defined herein may include review of other restrictions on an inmate's use of the device 34. The restrictions comprise limitations based on the time of day, day of week, controlled environment restrictions, and other restrictions determined by authorities of the controlled environment.

Continuing with actions associated with a request by the external device 22 for a communications session, upon validation the requested scheduling transaction is added to the blockchain ledger. The request is sent to wireless device 34, 46, 48, 50 that is the intended recipient. Confirmation is sent to the external device 22 of the requesting party.

When a communication between the external device 22 and the device 34 in possession of an inmate is completed according to set parameters, the deposited tokens are released to the controlled environment wireless system service provider. Otherwise the tokens may be released back to the walled that created the communications request.

Information associated with transactions is converted into an internet protocol (IP)-based format to assist in generating formatted information. The blockchain network may be one of a public blockchain, a private blockchain, and a consortium blockchain. Nodes on the blockchain may be one of an administrative node, a mandatory node, and an optional node.

The blockchain network may use at least one of a centralized ledger, a permissioned distributed ledger, and a permissionless ledger. Transactions may be at least one of compressed and encrypted.

System and methods described herein provide for the wireless communication device 34, 46, 48, 50 to record a voice or video session instead of the database 18. Further, the call is validated via the blockchain to allow error correction to insure the call continues. Upon completion, the recording is then stored in one or more of the blockchain and the central database 18 and the meta-data is added to the blockchain.

The invention claimed is:

1. A method of implementing and managing an inmate-specific smart contract, comprising:
   at least one computer on a blockchain network creating a smart contract containing information describing an inmate in a controlled environment;
   the at least one computer inserting the smart contract into the blockchain network;
   the at least one computer receiving a request to validate a blockchain transaction initiated by the inmate;
   the at least one computer executing the smart contract to validate the transaction, the validation based on verification of permissions described in the smart contract.

2. The method of claim 1, wherein the smart contract describes at least granted permissions and rights of the inmate and metadata associated with the inmate.

3. The method of claim 1, further comprising the at least one computer updating and modifying the smart contract based on at least changes to the granted permissions and rights and metadata associated with the inmate.

4. The method of claim 1, further comprising the at least one computer executing the smart contract to monitor, track, and record permission usage by the inmate and inmate transactions via the blockchain network.

5. The method of claim 1, wherein creation, verification, and auditing of the smart contract is limited to facility administration within the controlled environment.

6. The method of claim 1, wherein the metadata comprises at least one of inmate number and inmate biometric information.

7. The method of claim 1, further comprising the smart contract receiving access to databases and storage of the controlled environment.

8. The method of claim 7, further comprising the smart contract receiving the access to at least one of identify, update, remove, verify and extract data, metadata and permissions about the inmate.

9. A system for inmate metadata analysis and response in a controlled environment, comprising:
   a computer; and
   an application stored in the computer that when executed:
     creates an inmate-specific smart contract in a blockchain network to at least one of monitor, manage and reward behavior of an inmate in a controlled environment,
     receives notification of unapproved behavior by the inmate detected by at least the blockchain network, and
     based on the received notification, one of removes and limits at least one permission and right of the inmate.

10. The system of claim 9, wherein the system implements changes to the permissions and rights on at least one of a dynamic, ad-hoc and regular basis.

11. The system of claim 9, wherein the notification is received at least one of at time of creation of the smart contract and subsequent to such creation.

12. The system of claim 9, wherein the system one of additionally and alternatively receives notification of approved, encouraged, and desired inmate behavior detected by at least the blockchain network.

13. The system of claim 12, wherein based on the received notification, the system at least one of adds to and enhances inmate permissions and rights.

14. The system of claim 9, wherein the smart contract describes permissions and rights granted to the inmate and describes metadata associated with the inmate.

15. The system of claim 9, wherein the system further tracks transactions entered into by the inmate, the transactions comprising at least one of commissary transactions and accesses of electronic material.

16. A method of inmate management, comprising:
a computer certifying at least one of forms, records, and data requiring action by an inmate of a controlled environment;
the computer receiving a request from one of the inmate and the controlled environment for at least one of the forms, records and data;
the computer determining electronic verification and approval of the request based on signatures submitted to a blockchain; and
the computer, based on the determined verification and approval, fulfilling the request.

17. The method of claim 16, wherein the forms, the records, the data and metadata are shared and stored among nodes on the blockchain.

18. The method of claim 16, wherein the forms, the records, the data and metadata are alternatively stored on the facility databases associated with the controlled environment.

19. The method of claim 17, wherein the forms, the records, the data and metadata are at least one of accessed and verified via the blockchain by the computer.

20. The method of claim 16, wherein the required inmate action comprises at least one of input, acknowledgment, and response.

21. The method of claim 16, wherein the request is received from an approved personal communication device.

22. The method of claim 16, further comprising the computer receiving the signatures from at least one of the approved personal communication device and an administrative device.

23. The method of claim 16, wherein the signatures are cryptographically signed.

24. The method of claim 16, further comprising the computer at least one of updating and recreating an inmate-specific smart contract as needed via the blockchain in response to completion and verification of at least one of newly created and updated forms, records and data.

25. A system for providing commissary and virtual asset access privileges to inmates of a controlled environment, comprising:
a processor;
a memory; and
an application stored in the memory that when executed on the processor:
receives notification of a transaction executed via a blockchain, the transaction resulting in transfer of access tokens to an inmate of a controlled environment,
delivers, based on the notification, the access tokens to a blockchain wallet on an inmate communication device, the access tokens representing persistent access rights,
one of transfers and presents, based on a received instruction, at least one access token as payment for or proof of a right by the inmate to at least one of consume, view, and listen to physical assets and virtual assets, wherein uses and permissions provided by access tokens are predefined and are subject to change, update, expiration, and revocation.

26. The system of claim 25, wherein the inmate uses payment tokens to purchase access tokens, wherein the access tokens are to one of remain in the wallet to be presented as proof of a right to access goods, services and virtual assets, and spent as payment for one-time access for goods, services and assets.

27. The system of claim 25, wherein the virtual assets are at least one of an eBook, a commissary item, an audio file, a software application, a video file, and voice and video call usage minutes.

28. The system of claim 25, wherein virtual assets one of accessed and consumed by an inmate communication device are stored at least one of in a central database and in the inmate communication devices.

29. The system of claim 28, wherein the virtual assets are transmitted for download to the inmate communication device via at least one of a correctional facility mesh network and via streaming to the inmate communication device.

30. The system of claim 25, wherein delivery of and access to access tokens requires multi-signature cryptographic transactions via the blockchain by the inmate and the administration on at least one of a regular or ad hoc basis.

31. A method of controlling the use of an inmate communication device, comprising:
a computer creating a first smart contract describing first terms of usage of the device for a first user;
the device inserting the first smart contract into a blockchain upon receiving notice of approval of the first smart contract;
the device receiving entry of a first identifier associated with the first user seeking access to the device;
the device, based on receiving entry of the first identifier and via a locally executing application, scanning the blockchain to locate and verify the first smart contract and a one of a downloaded and locally-stored first electronic wallet associated with the first user; and
the device one of downloading the first electronic wallet associated with the first user and activating the locally-stored first electronic wallet associated with the first user and beginning a first usage session per the first terms of usage.

32. The method of claim 31, further comprising the first user is a first inmate in a controlled environment.

33. The method of claim 31, further comprising the device receiving the notice of approval from an administrative function of the controlled environment.

34. The method of claim 31, further comprising the device, at one of expiry, logout, and termination of the first usage session, ending access of the first user to the device and removing access to the first electronic wallet by the first user.

35. The method of claim 31, further comprising the device, at one of expiry, logout, and termination of the usage session, receiving physical movement to a second user comprising a second inmate in the controlled environment.

36. The method of claim 31, further comprising the device receiving entry of a second identifier associated with the second user.

37. The method of claim 31, further comprising the device scanning the blockchain to locate and verify a second smart contract and to provide the second user access to a second electronic wallet.

38. The method of claim 37, wherein the first and second electronic wallets contain tokens for use in commissary purchases by the first user and the second user, respectively.

\* \* \* \* \*